July 14, 1936. G. A. LEY 2,047,877
FLASHLIGHT SYNCHRONIZING DEVICE
Filed May 20, 1932  2 Sheets-Sheet 1

George A. Ley  Inventor

Patented July 14, 1936

2,047,877

UNITED STATES PATENT OFFICE 2,047,877

FLASHLIGHT SYNCHRONIZING DEVICE

George A. Ley, Chicago, Ill.

Application May 20, 1932, Serial No. 612,468

11 Claims. (Cl. 67—29)

The present invention relates to improvements in devices for synchronizing camera shutter release mechanisms with the ignition or explosion of a charge of flash powder or a flash lamp, although a flash lamp is chosen as the preferred embodiment.

Synchronizing devices of the type above referred to have been objectionable in that they are all of a more or less complicated nature and generally comprise a large number of movable or adjustable parts.

An object of the present invention, accordingly, is to produce a simple compact device of this character which will perform its function in a highly efficient manner, have only one adjustment, and be free of the above-specified disadvantages.

Prior synchronizing devices have been undesirable in that they usually constituted a permanent and undetachable part of the camera to which they were applied.

Accordingly, a further object of the present invention is to provide a synchronizing device which is readily portable from one camera to another and is applicable to any desired type of camera without modification in any shape or manner.

More specifically stated, the object of this invention is to provide a device which will simultaneously close an electrical circuit and actuate a camera shutter release mechanism through the application of a single external force.

The preferred embodiment of the invention resides in providing a pair of members pivoted together, each of such members containing a contact point and one of them being provided with means to retain the stationary portion of a cable type shutter release mechanism. On movement of the two pivoted members relative to one another, the device will be actuated simultaneously to release the camera shutter and ignite or activate the flash charge or flash lamp.

It will thus be seen that the performance of this double operation is greatly facilitated and simplified inasmuch as only a single manipulation is required of the operator for the actuation of the mechanisms.

Further objects of the invention will appear more fully as the description proceeds.

In the accompanying drawings, which illustrate one embodiment of the invention;

Figure 1:
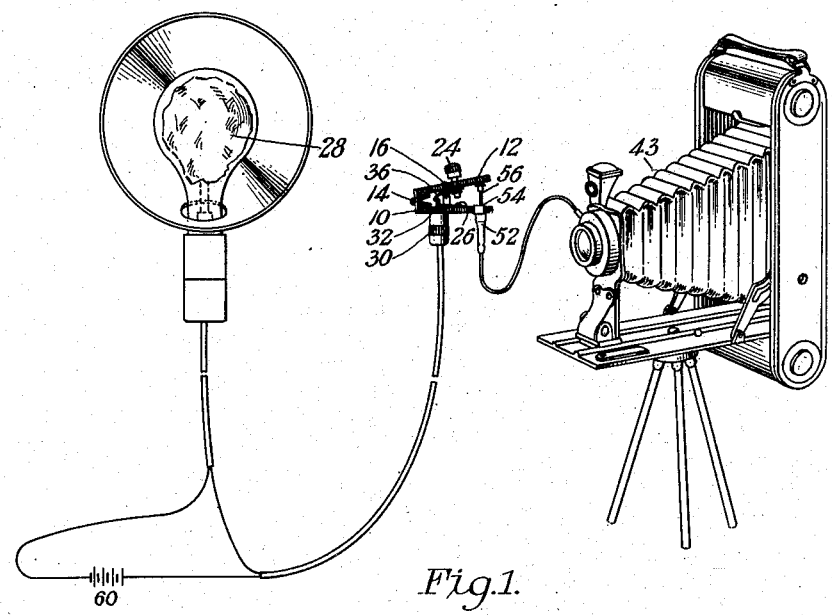
Figure 1 is a perspective view of a camera, flash lamp, and the improved synchronizer showing the manner of assembling them for operation.
Figure 2:
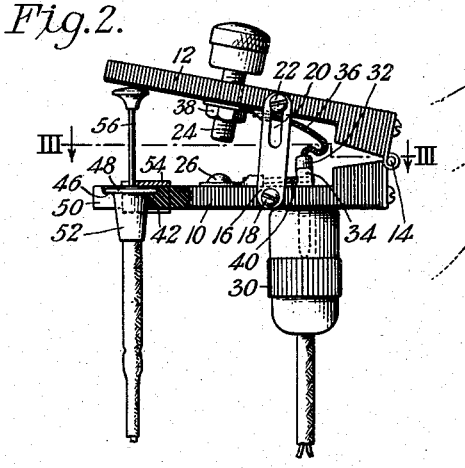
Figure 2 is a side elevational view of the synchronizer partly broken away showing the construction thereof.
Figure 4:
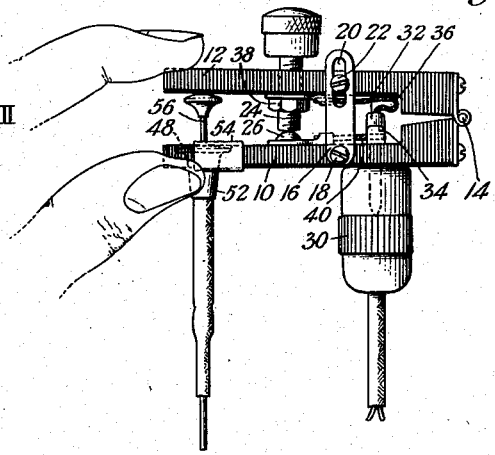
Figure 4 is a view similar to Figure 2 but showing the synchronizer in closed or operating position.
Figure 3:
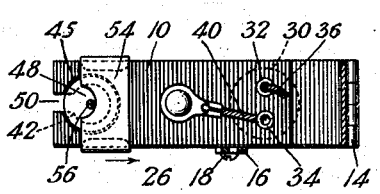
Figure 3 is a sectional top plan view of a portion of the synchronizer taken on the line III—III of Figure 2 illustrating the means for retaining the shutter release mechanism in the synchronizer.

Referring in detail to the drawings, wherein like reference characters indicate like parts, it will be seen that the first form of the device of the invention and disclosed in Figures 1 to 4 comprises a base plate 10 and a member 12, each being fabricated of hard rubber, phenolic condensation material or some similar insulating or non-conducting material. The members 10 and 12 are pivoted together as at 14 and interposed therebetween is a link 16 pivoted at 18 to the base member 10 and containing a slot 20 in which pin 22, fast to the member 12, has sliding engagement to prevent undue separation of members 10 and 12.

Screw threaded into the pivoted member 12 intermediate its ends is an adjustable contact member 24, adapted, on closing movement of members 10 and 12, to engage a fixed contact member 26 provided on the upper side of base member 10 intermediate the ends thereof in registering relation with the adjustable contact 24.

The connections leading to the flash lamp 28 or to the charge of flash powder are introduced into the base plate 10 through a plug 30 which is provided with contacts 32 and 34. To contact 32 there is soldered or otherwise attached a conductor 36 of any desired type which leads to the upper contact 24 to which it is attached by nut 38. Nut 38 also serves to lock the contact 24 in adjusted position as will be hereinafter more fully explained. A conductor 40 serves electrically to connect plug contact 34 with contact 26.

The base member 10 is provided with an aperture 42 which is adapted to receive the external metallic portion of a cable type shutter release mechanism 52 which leads to a camera 43. A countersunk or rabbeted portion 46 is provided around the upper surface of aperture 42 to receive the circular extended portion 48 usual in cable release mechanisms.

The aperture 42 is slotted as at 50 adjacent the forward end of member 10 to facilitate the introduction thereinto of release mechanism 52. A spring clip 54 is frictionally retained upon the base member 10 and is adapted to be slid forward so as partially to overlie the circular stationary portion 48 of the cable release mechanism 52 to retain that member in position.

The plunger 56 of cable release mechanism 52 is adapted to engage with its head the underside of pivoted member 12. It will be understood that the return spring usual in cable release mechanisms tends to open the synchronizing switch and is of sufficient strength to maintain the free ends of the pivoted members 10 and 12 in spaced relation until an external force is applied.

It will also be understood that this external force may be applied by any means, the device of the invention being peculiarly adapted because of its simplicity and its foolproof qualities to the apprehension of criminals by photography and to the securing of nocturnal photographs of wild life.

The wiring of the device is illustrated in Figure 1, the flash lamp 28 and synchronizer being connected in series. Any suitable source of power 60 may be utilized depending on the type of flash lamp or charge igniter employed. Flash lamps of the illustrated type are supplied in battery or city current sizes.

Figure 5:
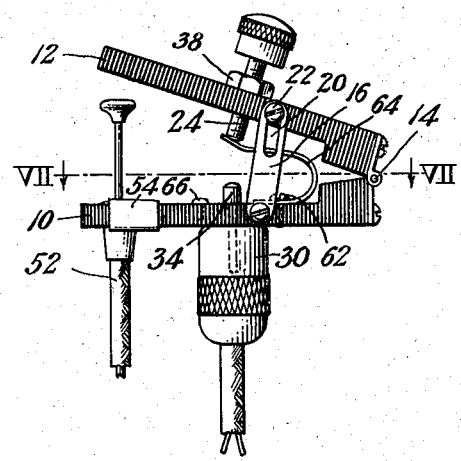
Figure 5 is a side elevational view similar to Figure 2 but showing a modification of the synchronizer.
Figure 6:
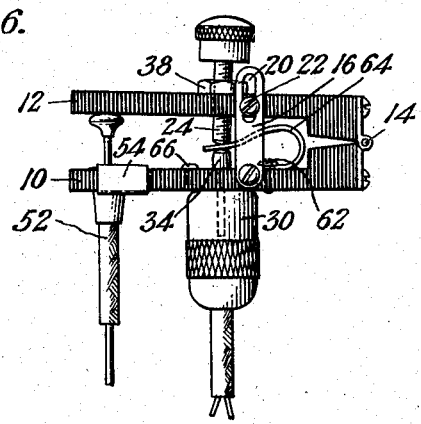
Figure 6 is a side elevational view showing the modified form of synchronizer in closed position.
Figure 7:
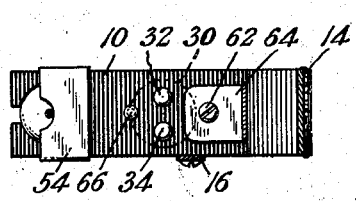
Figure 7 is a sectional view of the modified form of synchronizer taken on the line VII—VII of Fig. 5.

In the modification as illustrated in Figures 5 to 7, it will be noted that the synchronizer is of the same general type as the first form with a slight alteration of the circuit closing means.

This modification is more readily assembled than the type first described since the necessity of soldering conductors 36 and 40 to plug contacts 32 and 34 is entirely obviated. Moreover, the number of parts is materially reduced.

In this modification the arms 10 and 12 are pivoted together at 14 and the limiting spacer 16 is constructed as in the first form. The shutter release mechanism 52 is retained and actuated by the same set of instrumentalities and in the same manner as previously disclosed in connection with Figures 1 to 4.

The adjustable contact member 24 is secured in the upper arm 12 about midway of said upper arm as in the first form, but plug 30 is introduced into the lower arm 10 with its contacts registering with contact 24. These plug contacts are preferably aligned transversely of the synchronizer.

Secured to the base member 10 by a screw 62 is a curved spring member 64 of brass or other conducting material. Said spring member preferably is formed to extend rearwardly from screw 62 and to curve forwardly so that its uppermost end will underlie and engage contact 24 in all adjusted positions of that member due to the spring nature of member 64.

Spring member 64 is sufficiently broad at its forward end to overlie both plug contacts 32 and 34 and is adapted, upon the synchronizer's being closed, to be depressed by contact member 24 and brought into engaging relation to plug contacts 32 and 34. In this manner the electrical circuit will be closed across the plug contacts. It should also be noted that spring member 64 is of a flexible nature and can readily accommodate itself to the variations or differences in height of plug contacts 32 and 34.

A projection 66 is secured to lower arm 10 just forward of plug contacts 32 and 34 to prevent clip 54 from accidentally closing the circuit.

It will be seen that a means for causing a double contact is provided and, accordingly, the possibility of arcing, especially with the larger voltage type lamps is appreciably diminished as well as the number of parts materially reduced and the ease of assembling greatly increased.

It will be understood that the spring nature of member 64 also serves to maintain arms 10 and 12 in spaced relation.

It will of course be recognized and appreciated that a pneumatic or bulb type of shutter release may be employed in place of the cable release mechanism illustrated without necessitating material alteration and the employment of such type of release is contemplated as being within the spirit and scope of this invention.

In order to synchronize the camera and the switch, the back of the camera may be removed and test flashes taken with the switch connected to a small battery type incandescent bulb. The screw 24 on the synchronizer may be adjusted after loosening lock nut 38 in order that the circuit may be closed at any given time relative to the shutter's releasing.

Having thus disclosed my invention, what I claim and desire to secure by Letters Patent of the United States is:

1. A device of the type described comprising, a pair of members pivotally connected, each having a free end, one of said members being provided with an orifice for retaining a stationary portion of a shutter release mechanism, and said members being provided with means adapted to close an electrical flash circuit through single point contact as distinguished from sliding contact.

2. An article of the class described comprising, a pair of pivotally connected arms, contact points on said arms for closing an electrical flash circuit, one of said points being adjustable toward or from the other to vary the time of contact, and an orifice in one of said arms adapted to receive a portion of a shutter release mechanism.

3. A synchronizing switch comprising a pair of connected arms, means connected to one of said arms and contacting a projection on the second of said arms, said means being adapted to be depressed into contact with a second projection on the first-mentioned arm, a spring clip and an orifice, said clip and orifice being located upon the same arm and being adapted to retain stationary a portion of a shutter release mechanism.

4. In combination, a pair of pivotally connected members, electrical circuit closing means upon said members, an aperture in one of said members, and a clip slidable on said last mentioned member to a position overlying said aperture said clip and aperture being adapted to retain stationary a portion of a camera shutter release mechanism.

5. A device of the class described comprising, a pair of members pivoted together at one of their ends and each having a free end, said members each being provided upon facing portions thereof with a contact for closing a flash circuit, and one of said members being provided adjacent its free end with an orifice for retaining stationary a portion of a shutter release mechanism.

6. An article of the class described comprising, a pair of pivotally connected arms, contact members between opposed surfaces of said arms for closing an electrical flash circuit, and means on one of said arms for retaining stationary a portion of a shutter release mechanism.

7. A synchronizing switch comprising a pair of connected arms, means connected to one of said arms and contacting a projection on the other of said arms, said means being adapted to be depressed into contact with a projection upon said first mentioned arm, and an orifice in one of said arms adapted to receive a part of a shutter release mechanism.

8. A synchronizing switch comprising a pair of pivotally connected arms, a spring clip, contact members on one of said arms, means secured to one of said arms but adapted to be actuated by the other of said arms to close an electrical flash circuit by engaging said contact members, and an orifice in one of said arms and covered by said spring clip, said orifice and clip being adapted to retain stationary a portion of a shutter release mechanism.

9. Flashlight apparatus embodying therein the combination with a camera having a shutter, and a mechanical release mechanism therefor having immovable and movable elements, of a support for a flash bulb unconnected with and movable independently of, said camera, a control device embodying therein two relatively movable members, one of which embodies means whereby the immovable element of said shutter release mechanism may be attached thereto, and a switch contact, and the other of which members embodies a switch contact adapted to co-operate with the contact carried by said other member and is engageable with the movable element of said shutter release mechanism, an electrical source, and circuit forming connections between said source and said bulb including therein said switch contacts.

10. Flashlight apparatus embodying therein the combination with a camera having a shutter, and a mechanical release mechanism therefor comprising an immovable sheathing, and a wire movable in said sheathing and projecting beyond opposite ends thereof, of a support for a flash bulb unconnected with, and movable independently of, said camera, a control device embodying therein two members, and a hinge connection between said members at one end thereof, one of said members embodying means whereby said sheathing may be attached thereto, and a switch contact, and the other of said members embodying a switch contact adapted to cooperate with the contact carried by said other member and to engage the projecting end of said movable wire, an electrical source, and circuit forming connections between said source and said bulb including therein said switch contacts.

11. Flashlight apparatus embodying therein the combination with a camera having a shutter, and a mechanical release mechanism therefor having immovable and movable elements, of a support for a flash bulb unconnected with, and movable independently of, said camera, a control device embodying therein two relatively movable members, one of which embodies means whereby the immovable element of said shutter release mechanism may be attached thereto, and a switch contact, and the other of which members has adjustably mounted therein a switch contact adapted to cooperate with the contact carried by said other member and is engageable with the movable element of said shutter release mechanism, an electrical source, and circuit forming connections between said source and said bulb including therein said switch contacts.

GEORGE A. LEY.